US009079792B2

(12) United States Patent
Rockosi et al.

(10) Patent No.: US 9,079,792 B2
(45) Date of Patent: Jul. 14, 2015

(54) FUSED SILICA BODY WITH VITREOUS SILICA INNER LAYER AND METHOD FOR MAKING THE SAME

(71) Applicant: RAYTHEON COMPANY, Waltham, MA (US)

(72) Inventors: Derrick J. Rockosi, Lynn, MA (US); Richard Gentilman, Acton, MA (US); Christopher K. Solecki, Allen, TX (US); Allen L. Kelly, Dallas, TX (US); William C. Strauss, Westford, MA (US); Brian Gahan, McKinney, TX (US)

(73) Assignee: RAYTHEON COMPANY, Waltham, MA (US)

( * ) Notice: Subject to any disclaimer, the term of this patent is extended or adjusted under 35 U.S.C. 154(b) by 188 days.

(21) Appl. No.: 13/783,106

(22) Filed: Mar. 1, 2013

(65) Prior Publication Data

US 2013/0167589 A1 Jul. 4, 2013

Related U.S. Application Data

(62) Division of application No. 13/077,015, filed on Mar. 31, 2011.

(51) Int. Cl.
*C03B 29/04* (2006.01)
*C03B 29/02* (2006.01)

(52) U.S. Cl.
CPC .............. *C03B 29/04* (2013.01); *C03B 29/02* (2013.01); *Y10T 428/1317* (2015.01); *Y10T 428/26* (2015.01)

(58) Field of Classification Search
CPC ...................... C03B 29/02; C03B 29/04
See application file for complete search history.

(56) References Cited

U.S. PATENT DOCUMENTS 2,270,718 A 1/1942 Skaupy et al.
2,507,433 A 5/1950 Borchert et al.
(Continued)

FOREIGN PATENT DOCUMENTS

CN 101988214 A 3/2011
EP 2 226 300 A1 9/2010
(Continued)

OTHER PUBLICATIONS

"Ceramic Systems for Missile Structural Applications," Engineering Experiment Station Georgia Institute of Technology, Prepared under Navy, Bureau of Naval Weapons, Contract NOw-63-0143-d, Summary Report No. 1, (Quarterly Report No. 4 Inclusive), Nov. 1, 1962 through Oct. 31, 1963, Atlanta, Georgia, 47 pages.
(Continued)

*Primary Examiner* — Queenie Dehghan
(74) *Attorney, Agent, or Firm* — Christie, Parker & Hale, LLP

(57) ABSTRACT

A fused silica body comprising a layer of vitreous silica adjacent at least a portion of an inner surface is described in embodiments herein. In other embodiments, a method of making a fused silica body with a layer of vitreous silica adjacent at least a portion of an inner surface is described herein, comprising heating at least a portion of the inner surface to the point of vitrification. In certain embodiments, the method involves passing a linear local heat source over the inner surface in a particular manner, such as a helical fashion transverse to the linear shape, and may involve creating on the inner surface of the body overlapping swaths of temporarily melted silica material.

15 Claims, 6 Drawing Sheets

(56) References Cited

U.S. PATENT DOCUMENTS

| | | | |
|---|---|---|---|
| 3,811,857 A * | 5/1974 | Deeg et al. | 65/65 |
| 4,338,114 A * | 7/1982 | Brockway et al. | 65/28 |
| 4,440,558 A | 4/1984 | Nath et al. | |
| 4,949,095 A | 8/1990 | Neil et al. | |
| 4,956,208 A | 9/1990 | Uchikawa et al. | |
| 5,028,407 A | 7/1991 | Chieng et al. | |
| 5,497,004 A | 3/1996 | Rudolph et al. | |
| 5,692,087 A | 11/1997 | Partus et al. | |
| 5,736,206 A | 4/1998 | Englisch et al. | |
| 6,091,375 A | 7/2000 | Goto et al. | |
| 6,405,563 B1 | 6/2002 | Nagata et al. | |
| 6,462,891 B1 | 10/2002 | Fukumoto et al. | |
| 7,299,658 B2 | 11/2007 | Ohama et al. | |
| 7,305,852 B2 | 12/2007 | Gotoh et al. | |
| 2002/0170316 A1 | 11/2002 | Leist et al. | |
| 2003/0104920 A1 | 6/2003 | Schwertfeger et al. | |
| 2004/0050099 A1 * | 3/2004 | Fukui et al. | 65/17.6 |
| 2004/0237588 A1 | 12/2004 | Schwertfeger et al. | |
| 2006/0177787 A1 | 8/2006 | Mizuno et al. | |
| 2009/0084308 A1 | 4/2009 | Kishi et al. | |
| 2010/0000465 A1 | 1/2010 | Kishi et al. | |
| 2010/0071613 A1 | 3/2010 | Kishi et al. | |
| 2010/0107691 A1 | 5/2010 | Sato et al. | |
| 2010/0139549 A1 | 6/2010 | Sakurada et al. | |
| 2010/0229599 A1 | 9/2010 | Fujita et al. | |
| 2010/0244311 A1 | 9/2010 | Kishi et al. | |
| 2011/0079047 A1 | 4/2011 | Suzuki et al. | |
| 2011/0197631 A1 | 8/2011 | Sudo et al. | |
| 2011/0256329 A1 | 10/2011 | Thomas et al. | |

FOREIGN PATENT DOCUMENTS

| | | |
|---|---|---|
| ES | 2 041 587 A2 | 11/1993 |
| JP | 62-257805 | 11/1987 |
| JP | 09-506324 | 6/1997 |
| JP | 09-506324 A | 6/1997 |
| JP | 11-011956 | 1/1999 |
| JP | 2001-342030 | 12/2001 |
| JP | 2001-342030 A | 12/2001 |
| JP | 2006-273666 A | 12/2006 |
| JP | 2008-081375 A | 4/2008 |
| JP | 2008-528813 A | 7/2008 |
| KR | 10-2004-0103775 | 12/2004 |
| TW | 201016622 A | 5/2010 |
| WO | WO 95/13248 | 5/1995 |
| WO | WO 95/13248 A1 | 5/1995 |
| WO | WO 2007/084144 A2 | 7/2007 |
| WO | WO 2011/019012 A1 | 2/2011 |

OTHER PUBLICATIONS

CNC USB Controller, PlanetCNC as viewed at http://web.archive.org/web/20100117181238/http://www.planet-cnc.com/ dated back to Jan. 17, 2010 and viewed on Aug. 16, 2012 (1 page.)

English language translation of Korean Office action for corresponding Korean Application No. 10-2012-0009543, filed Jan. 31, 2012, Office action dated Jun. 27, 2013 (4 pgs.).

English language translation of Korean Office action mailed Sep. 27, 2013 for Korean Application No. 10-2012-0009538, filed Jan. 31, 2012 Applicant Raytheon Company, Office action mailed Sep. 27, 2013 (3 pgs.).

English translation of First Office Action issued on Jul. 30, 2013 in corresponding Japan Application No. 2012-016920 (4 pgs.).

English Translation of Office Action for Japan Application No. 2012-016918, Filed Jan. 30, 2012, Japan Office Action mailed Jul. 30, 2013 (4 pgs.).

Extended European Search Report for European Application No. 12153069.5, Filed Jan. 30, 2012, Extended European Search Report dated Jul. 11, 2013 and mailed Jul. 18, 2013 (8 pgs.).

Extended European Search Report for European application No. 12153103.2, Filed Jan. 30, 2012, Extended European Search Report dated Jul. 11, 2013 and mailed Jul. 18, 2013 (6 pgs.).

First Office Action in corresponding Japan Application No. 2012-016920, First Office action mailed Jul. 30, 2013 (3 pgs.).

Japan Decision of Rejection mailed Nov. 26, 2013 for corresponding Japan Application No. 2012-016920, filed Jan. 30, 2012 with English translation (4 pgs.).

Japan Decision of Rejection mailed Nov. 26, 2013 for related Japan Application No. 2012-016918, filed Jan. 30, 2012 with English translation (4 pgs.).

Korean Office action for corresponding Korean Application No. 10-2012-0009543, filed Jan. 31, 2012, Office action dated Jun. 27, 2013 (5 pgs.).

Korean Office action mailed Sep. 27, 2013 for Korean Application No. 10-2012-0009538, filed Jan. 31, 2012 Applicant Raytheon Company, Office action mailed Sep. 27, 2013 (4 pgs.).

Office Action for Japan Application No. 2012-016918, Filed Jan. 30, 2012, Japan Office Action mailed Jul. 30, 2013 (3 pgs.).

Taiwan Office action mailed Dec. 3, 2013 for related Taiwan Application No. 101102852, filed Jan. 30, 2012 with partial English translation (7 pgs.).

Taiwan Office action mailed Nov. 21, 2013 for corresponding Taiwan Application No. 101102848, filed Jan. 30, 2012 with partial English translation (6 pgs.).

* cited by examiner

FUSED SILICA BODY WITH VITREOUS SILICA INNER LAYER AND METHOD FOR MAKING THE SAME

CROSS-REFERENCE TO RELATED APPLICATION(S)

This application is a divisional of U.S. patent application Ser. No. 13/077,015, entitled FUSED SILICA BODY WITH VITREOUS SILICA INNER LAYER AND METHOD FOR MAKING THE SAME, filed Mar. 31, 2011, published Oct. 4, 2012 as Publication No. US 2012/0251745 A1 the entire contents of which are incorporated herein by reference.

STATEMENT REGARDING FEDERALLY SPONSORED RESEARCH

This invention disclosure is related to Government contract number 5BRS290608700. The U.S. Government has certain rights in this invention.

BACKGROUND OF THE INVENTION

Fused silica ceramic bodies are practical and advantageous for diverse applications. They can be easily and relatively inexpensively manufactured through slip casting and other methods. They feature a number of beneficial properties such as strength, durability and light weight. In certain special applications, fused silica ceramics display additional beneficial properties. One such special application is as an electromagnetic window, such as a "radome" covering for radar antennas and electronics, and fused silica radomes can often be found in aerospace applications such as aircraft or missile nosecones. The dielectric properties of fused silica make it especially suitable for a radome application, as fused silica does not significantly interfere with the radio frequency energy being transmitted and received by the antenna. Another special application making use of fused silica's advantages is pharmaceutical mixing; ceramic pestles and crucibles are often used. In this application, again, the silica is strong and lightweight, adjusts well to changes in temperature, and resist crumbling. The silica does not interact with most reagents being mixed, and ceramic utensils resist staining, do not rust or oxidize, and are relatively easy to clean.

However, fused silica bodies also have certain drawbacks in these various applications. Significant among these drawbacks is that fused silica, unless fully dense, is porous and allows moisture and other fluids to penetrate the wall thickness from one side of the body to the other. This may be unacceptable for several reasons, the specific reasons depending on the particular application. For example, in the case of slip cast fused silica bodies used as radomes in external or aerospace applications, the semi-porous fused silica wall permits moisture from the outside atmosphere to penetrate the radome wall and potentially reach the sensitive electrical components located inside that are critical to system performance. These sensitive components benefit from environmental protection over extended periods of time. In these applications, seepage of moisture presents a serious difficulty for radar equipment operational quality, or even survival in inhospitable environments. As another example, in the pharmaceutical mixing application the semi-porous fused silica permits external moisture to penetrate the vessel wall and contaminate the chemicals that are being compounded inside the vessel. The rough texture of the silica also permits reagent residue to cling to the interior of the vessel and resist complete removal.

In aerospace applications where fused silica radomes have been used without any protective coating or barrier, the moisture penetration problem has made it necessary to further enclose the sensitive electronic equipment inside the radome within its own environmentally sealed enclosure. Where attempts have been made to seal the radome itself, use has been made of organic, inorganic, or combination organic-inorganic coatings as moisture transmission barrier layers. These material layers have typically been chosen to minimize interference with the dielectric performance of the radome and to match relevant material properties of the radome body. Some of these coatings have been used with fair success in conjunction with certain other types of radome materials but have had varying and uneven results with fused silica. In many cases, there is a significant capital investment to place these thin (usually less than ten micrometer) coatings onto a radome. In addition, many of these coatings can only be applied to a radome exterior, leaving the coating susceptible to damage from normal handling and wear and tear. In some cases application of the coating materials may require a heat treatment that can significantly affect the material properties of the base radome body and damage the moisture barrier coating itself. Further, the addition of these materials may degrade the RF dielectric profile and performance of the radome.

SUMMARY OF THE INVENTION

Embodiments of the present invention address the moisture penetration and other problems by creating a thin, uniform vitrified silica layer on at least a portion of the inner surface of a fused silica body. This layer is either fully vitreous or at least sufficiently vitreous to prevent moisture and other fluids from penetrating through the wall of the body. Because embodiments in accord with the present invention generate the vitreous inner layer autogenically from the fused silica of the parent body itself by changing the material properties of the existing body material, the barrier layer is fully adhered and integrated with the body itself, eliminating adhesion concerns and giving the layer additional durability against wear and tear and resistance from delamination. In addition, the dielectric properties of an autogenic vitreous silica layer represent an improvement over the dielectric properties of foreign material applied to a radome wall.

According to certain embodiments, the present invention is directed to a fused silica body comprising a layer of vitreous silica adjacent at least a portion of an inner surface of the body. In certain of those embodiments, the layer of vitreous silica is autogenically fused to the remainder of the body. In another embodiment, the layer of vitreous silica is substantially impervious to moisture. In another embodiment, the layer of vitreous silica has a density approaching a theoretical maximum density. In another embodiment, the inner surface of the fused silica body defines a concave cavity. In another embodiment, the layer of vitreous silica extends over substantially all of the inner surface of the fused silica body. In another embodiment, the thickness of the layer of vitreous silica is between approximately five thousandths of an inch and approximately twenty thousandths of an inch. In another embodiment, the fused silica body comprises a surface communicating with the inner surface and comprises a layer of vitreous silica adjacent at least a portion of that communicating surface. In another embodiment, the fused silica body is configured for use as a radome. In another embodiment, the fused silica body is configured for use as a vessel for mixing substances. In another embodiment, the fused silica body is formed by slip casting.

According to other embodiments, the present invention is directed to a method of making a fused silica body comprising a layer of vitreous silica adjacent at least a portion of an inner surface, the method comprising heating at least a portion of the inner surface to the point of vitrification. In certain embodiments, the method comprises passing over at least a portion of the inner surface a heat source configured to heat at one time a relatively small area of the inner surface. In certain of those embodiments, the heat emanating from the heat source is between 2600° C. and 3200° C. In certain embodiments, the method comprises passing the heat source over the inner surface at a substantially constant standoff distance. In certain embodiments, a pattern of emanating heat from the heat source is longer in one direction than in another direction, and the longer direction is disposed transversely to a direction of movement of the heat source with respect to the surface. In certain of those embodiments a portion of the surface rendered viscous by a pass of the heat source overlaps a portion previously rendered viscous by a previous pass of the heat source, and in certain of those embodiments a width of the overlap is approximately one half a width of the portion previously rendered viscous by the previous pass of the heat source. In other embodiments, the heat emanating from the heat source is canted in substantially a direction of relative movement of the heat source with respect to the surface, in order to provide a preheat zone ahead of the surface melt region. In other embodiments, the heat source is moved helically in relation to the inner surface, in some of those embodiments the helical movement is produced by rotation of the fused silica body and linear movement of the heat source, and in some of those embodiments the speed of rotation of the fused silica body varies. In another embodiment, the helical movement comprises translation of the heat source inward or outward with respect to an axis of rotation of the fused silica body so as to maintain a substantially constant standoff distance between the heat source and portions of the inner surface having varying distances from the axis of rotation. In certain embodiments, the method comprises bias heating a substantial portion of the fused silica body to a temperature lower than a temperature causing vitrification, and in some of those embodiments the bias heating raises the temperature of that substantial portion of the fused silica body to between approximately 600° C. and approximately 1000° C. In another embodiment, the method comprises annealing the fused silica body.

DETAILED DESCRIPTION

Certain embodiments of the present invention disclose a fused silica body with an autogenic vitrified silica layer. That body, or piece, may have most any shape, and walls of any thickness greater than about 30 thousandths of an inch. In some embodiments the shape of the piece comprises a surface of revolution, and in exemplary embodiments the piece may be conical or ogive in shape. In other embodiments, the piece may have more of a flat center and assume a shape more like a cup. In other embodiments, the piece may be substantially or entirely flat. The vitrified piece in accord with embodiments of the present invention may be used for any application where the benefits of a fused silica body may be improved by a moisture barrier or any of the other properties imparted by the presence of an autogenic vitreous silica layer. The particular applications mentioned here, aerospace radome and pharmaceutical mixing vessel, are used as convenient examples only and are not intended to be limiting.

Figure 1B:
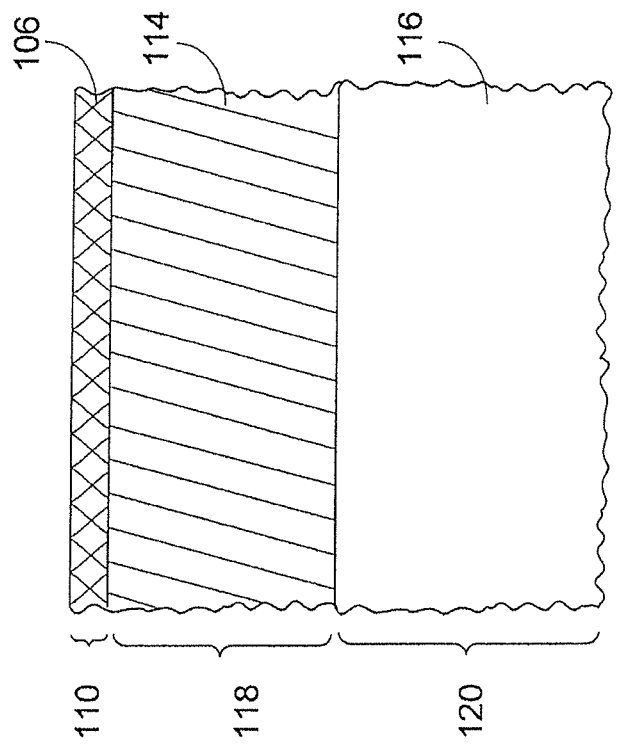
FIG. 1B is a close-up cutaway side view of the layers of the wall of a fused silica body with vitrified inner layer.
Figure 1A:
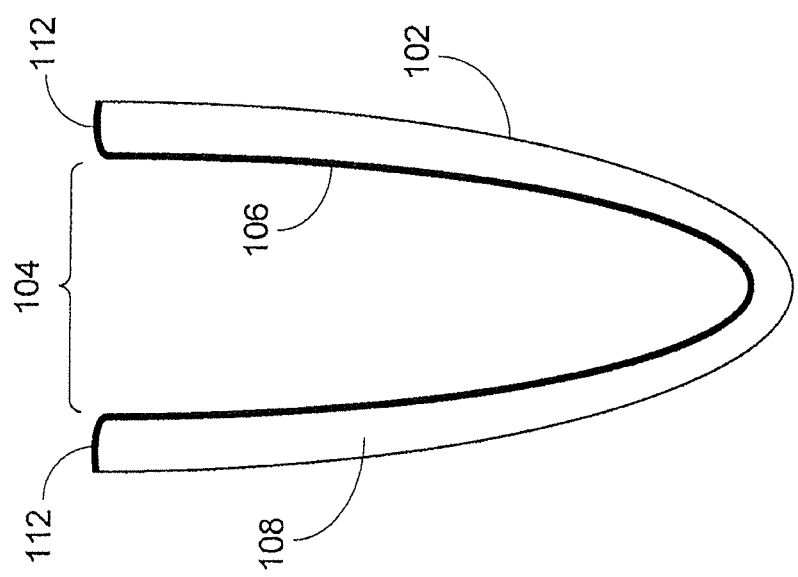
FIG. 1A is a cutaway side view of a fused silica body with vitrified inner layer and vitrified aft lip in accordance with embodiments of the present invention.

A fused silica body, or piece, 102 in accord with embodiments of the present invention is depicted in FIG. 1A, with a close-up view of an inner portion of such piece in FIG. 1B. The base piece may be initially produced by any number of methods, for example slip casting and sintering. In one embodiment, the piece comprises at least one concave interior cavity 104, and the cavity features over some or all of its inner surface a layer of vitreous silica 106. This inner layer is relatively thin in comparison to the overall wall thickness of the piece, and is integrated with and fused to the remainder 108 of the body, having been autogenically produced from it. A vitreous layer having a thickness 110 of at least approximately five thousandths of an inch imparts a barrier that can be repeatably demonstrated to be substantially impervious to moisture intrusion into the inner cavity. In some embodiments, the vitreous layer extends to a rim 112 bordering on and/or communicating with the inner concave surface, and the vitreous layer may also extend beyond that.

Minimizing the thickness of the vitreous layer relative to the thickness of the unaltered remainder of the body may impart advantages for certain applications. The unaltered body tends to be more damage tolerant than the vitreous layer, and the vitreous layer may tend to propagate cracking more than unaltered material; these advantages of unaltered material are maximized by leaving the maximum thickness of unaltered material. In RF applications, the vitreous layer may display different dielectric properties from unaltered material. For a radar radome application the dielectric properties of vitreous silica tend to be less favorable than those of unaltered silica, being less transparent to transmission of RF energy. In these types of applications it may be advantageous for the vitreous layer to be just thick enough to establish an effective sealing layer, typically in the range of five to twenty thousands of an inch.

On the other hand, in other applications such as pharmaceuticals, a thicker layer of vitreous silica may be beneficial for its improved durability to, for example, withstand scraping by the mixing instruments and reagents being mixed. A typical pharmaceutical application may utilize a vitreous layer on the order of fifty thousandths of an inch or more.

The vitrification process densifies the silica in the vitreous layer. Based on a maximum possible silica density of 2.13 gm/cc, a slip cast silica body typically features a density around 1.92 gm/cc, approximately 90% of maximum density, while the fully vitrified layer approaches 100% density. A density gradient 114 may exist between the vitreous layer 106 and the unaltered remainder 116 of the fused silica body, with the material in this gradient transitioning from unaltered fused silica toward vitreous silica and increasing in density toward the inner layer. In situations where the vitreous silica layer has a thickness of between 5 and 20 thousandths of an inch, the density gradient zone has a thickness 118 of typically between 30 and 60 thousandths of an inch. The presence of such a transition layer may contribute to the overall durability of the body, and may also contribute to the moisture barrier. Beyond a certain minimum thickness, the overall thickness 120 of the body wall is not constrained by embodiments of the present invention, and may be any thickness. A radome, for example, may typically be a quarter inch in overall wall thickness. Thickness of the various layers may be gauged by destructive testing and visual inspection and measurement. This is aided by the unvitrified fused silica body being typically white in color, while the vitreous layer is typically clear.

To vitrify the layer, the surface of the piece must be taken above the softening point of silica, approximately 1700° C., into a temperature zone enabling viscous flow and vitrification. It is advantageous to do this in a manner that avoids certain unwanted phenomena.

The first of these unwanted phenomena is the "boiling" of the silica and the slumping of its geometry due to gravity. These and other undesirable effects begin to be observed when the temperature of a significant portion of the piece rises above 1740-1760° C. These effects may include bubbling, brittleness, and loss of dimensional stability. The subsequent cooling of the silica once overheated may then freeze bubbles into the surface and solidify a slump into the surface geometry. These undesirable effects become more pronounced as the piece's temperature rises, and a piece whose overall temperature once reaches 1900° C. becomes significantly unworkable. Because the range between the minimum surface temperature necessary for vitrification and the maximum desirable peak temperature for the overall piece is so small, care must be taken to minimize the amount of material heated above this relatively narrow range and the time duration of such heating.

The second of these unwanted phenomena is dunting. Dunting is caused by factors such as crystalline formation and intra- and inter-layer differential expansion strain. The surface temperature needed to vitrify silica exceeds the generative temperatures for various crystalline forms of silica, including cristobalite. Cristobalite is a chief concern in this regard, because while most forms of silica feature a relatively low coefficient of thermal expansion over a wide temperature range, a sharp-step expansion/contraction of cristobalite occurs at 250° C. when its crystalline phase transitions between alpha-cristobalite and beta-cristobalite. Thus, to avoid significant differential expansion of the piece from this transition and the attendant dunting risk, it is preferable to vitrify the layer without generating or only minimally generating unwanted crystalline forms, especially cristobalite. This can be aided by use of a high purity fused silica piece, containing fewer extraneous quartz or cristobalite crystals that might undesirably function as seed crystals to grow colonies of quartz or cristobalite crystals within the piece. However, best results are obtained by minimizing the amount of unvitrified silica heated to crystalline-generative temperatures and also minimizing the time during which crystalline-generative heating is applied to the piece.

Accordingly, in an embodiment of the present invention these above-considered problems are handled by taking only a portion of the surface at a time above the 1700° C. softening point of silica, and doing so only briefly before quickly cooling that surface portion back below the softening point and below the temperature zone of crystalline formation. This brief, focused surface heating minimizes both the amount of silica heated into the crystalline formation and silica boiling temperature ranges and the time duration during which such silica remains in those ranges.

Figure 2A:
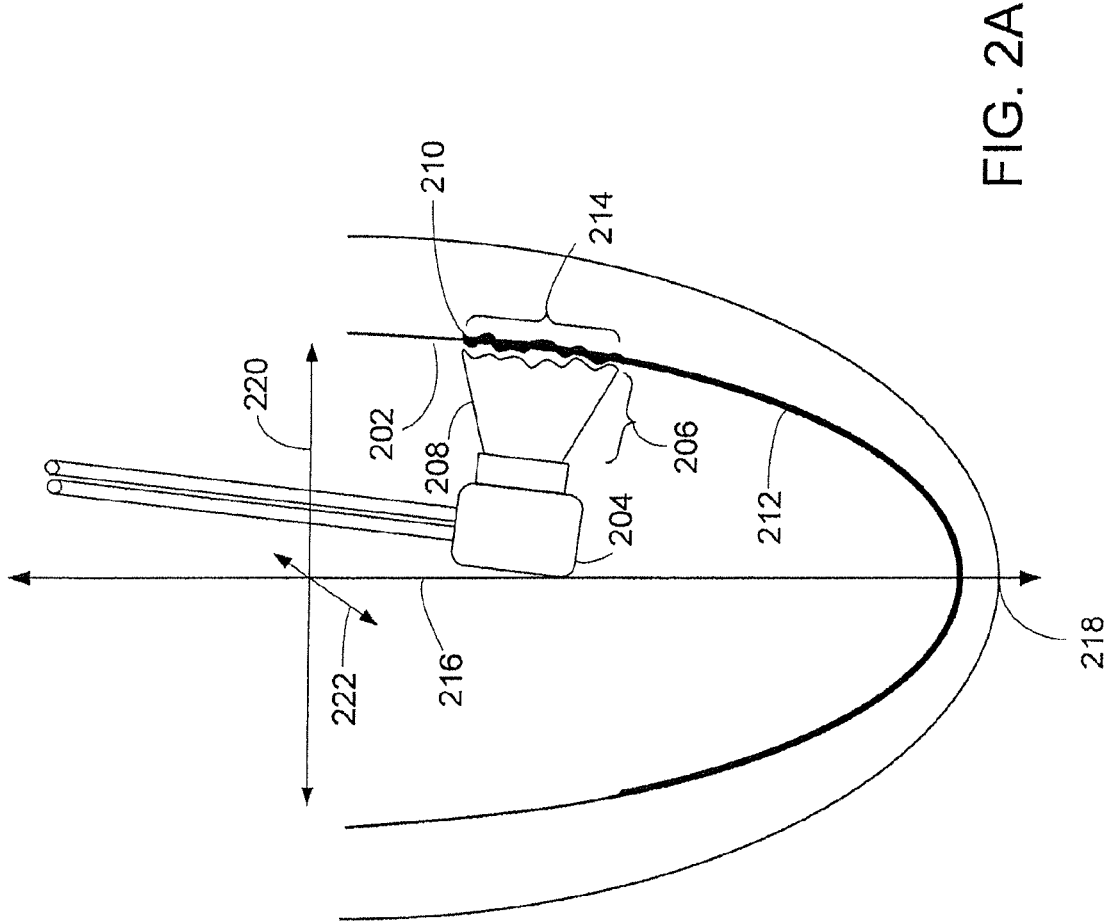
FIG. 2A is a cutaway side view of an area heat source moving within a fused silica body and vitrifying its inner surface.

In an embodiment of the present invention, as depicted in FIG. 2A, the brief, focused superheating of the surface 202 is accomplished by passing over the various portions of the surface to be vitrified a local area superheating heat source 204. This focused heat source operates typically in the temperature range of 2600°-3200° C., and may comprise a torch or any other device capable of delivering superheating thermal energy to a local area of the surface. The exemplar area heat source depicted in FIG. 2A is a fueled torch with a flame region 208 pointed generally toward the surface. This area heat source is passed sequentially over the entire surface to be vitrified, melting the fused silica surface nearest the flame or other emanating heat into a patch of fluid-state silica 210 which then, once the area heat source moves away, hardens into a thin vitrified silica layer 212.

In a preferred embodiment the area heat source is a linear or "ribbon" heat source rather than a point heat source. Typically a linear heat source permits the ribbon of melted silica all along the "melt width" 214 of a linear superheated zone to flow more naturally than with a point heat source, particularly one implemented by a circular point torch flame, which tends to centrifugally displace the superheated melted silica out from under the flame, and may produce pitting, cratering, or grooving of the vitrified surface. In a preferred embodiment using a torch as an area heat source, the torch uses low gas velocity, which further minimizes displacement of melt material as compared with use of a high-velocity gas torch.

It should be noted that the movement of the area heat source is in relation to the surface being vitrified, and is without reference to which of the area heat source or the piece is moving with respect to the outside world. In various embodiments in accord with the present invention, the area heat source may perform all movement as against a stationary piece, a piece may perform all movement as against a stationary heat source, or both the area heat source and the piece may contribute a component of the desired relative movement.

For ease in discussing the motion of the area heat source relative to the piece, three arbitrary orthogonal axes, as depicted in FIG. 2A, are defined here. For ease of description, the piece depicted is a substantially symmetrical surface of revolution, though embodiments of the present invention require neither a surface of revolution nor symmetry in the piece being processed. The first axis is the axis of rotation 216 of the piece, which runs through the leading tip 218 of a symmetrical piece and through the center of the aft cavity opening opposite the tip. In embodiments of the present invention that involve rotation of the piece during processing, the piece is rotated approximately around its axis of rotation. The shape of the piece being processed typically approximates a surface of revolution about this axis, with the cavity to be processed also being roughly symmetrical about this axis. However, the piece may not be a true or precise surface of revolution, as the piece and/or the cavity may feature irregular structures, shelves, or indentations. The other two axes are defined with respect to the heat source rather than any particular point on the piece, since in some embodiments the piece is rotating and consequently it is easier to describe the motion of the heat source in terms of axes that remain stable with respect to that heat source. Accordingly, the second axis is the radial axis 220, which is normal to the axis of rotation and extends from the axis of rotation in the direction of the area heat source. The third axis is the tangential axis 222, which is normal to the other two axes defined here, and generally runs tangent to the surface of the piece at the point closest to the area heat source. For further ease in discussing the positioning and motion of the area heat source and the piece, the concepts of upwards and downwards are used here, as though the piece were positioned with its tip facing down and its aft edge or cavity opening facing up. These are used only for convenient reference, however, and while in one preferred embodiment the piece is processed in that orientation, other embodiments of the present invention do not require the piece be processed in that physical orientation or the orientations shown in the drawing figures.

In a preferred embodiment, the linear superheating region of the area heat source is disposed transversely to the direction of the heat source's travel around the surface being vitrified, thus creating a briefly superheated swath extending across the surface as the heat source moves along, such swath possessing a melt width 214 determined by the linear size of the area heat source. The heat source may be moved over the surface in any pattern that provides even heating coverage over all areas for which a vitrified layer is desired. To achieve this, the heat source may be positionable relative to the piece by translation along any dimensional axes or rotation around any of them.

Figure 3:
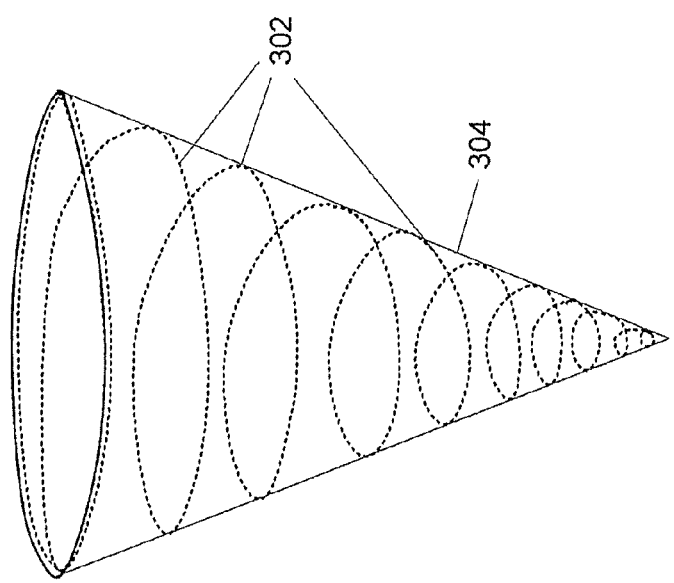
FIG. 3 is a transparent side view schematic depiction of a helical path followed by an area heat source moving within a fused silica body and vitrifying its inner surface.

As depicted in FIG. 3, an embodiment of the present invention preferred for use with a generally concave inner surface combines relative rotation of the area heat source around the axis of rotation with a relatively slower translation of the area heat source along the axis of rotation to create a helical "rastering" motion that scans the area heat source in successive spiral sweeps 302 over the entirety of the concave inner surface 304. (For clarity and simplicity of depiction, certain aspects and features in accord with certain embodiments of the present invention, such as closely positioned, overlapping swaths, flat beginning and ending swaths, and use of multiple heat sources for various sections of the inner surface, are not shown in FIG. 3.) This relative motion of the area heat source with respect to the body being processed can be accomplished by moving either or both of the heat source and the body, and in an exemplary embodiment the rotational component of this desired helical motion is achieved by rotating the body.

Where the cavity features a flat bottom rather than a conical tip, once again any motion that covers the area may be used, but certain motions may be preferable for efficient coverage of the surface with the least amount of wasted relative movement and for ease of promptly occurring overlap. One exemplary embodiment processes a flat or shallow surface intercepting the axis of rotation by initially placing the area heat source over the surface at the intercept of the axis of rotation, and then spiraling the heat source out from that point along the flat or shallow surface to the point where that that surface either ends or curves upward toward the aft end of the cavity. In processing such a flat-bottomed piece with an upward wall, the heat source would at the outer edge of the flat surface begin the extension of its flat spiral into the third dimension as a helix. To effect such a spiral and helix in an embodiment where the rotational component of the movement is being imparted by rotating the piece, the area heat source initially positioned over the flat surface at the axis of rotation intercept would translate outward flatly along the radial axis until the wall curvature was reached, at which time the translation along the radial axis would slow or stop and a translation upward along the axis of rotation would begin or accelerate. In another embodiment, if the piece being processed were substantially or entirely flat, a spiral movement with only a small or no translation along the axis of rotation could be used to process the entire piece.

Figure 2B:
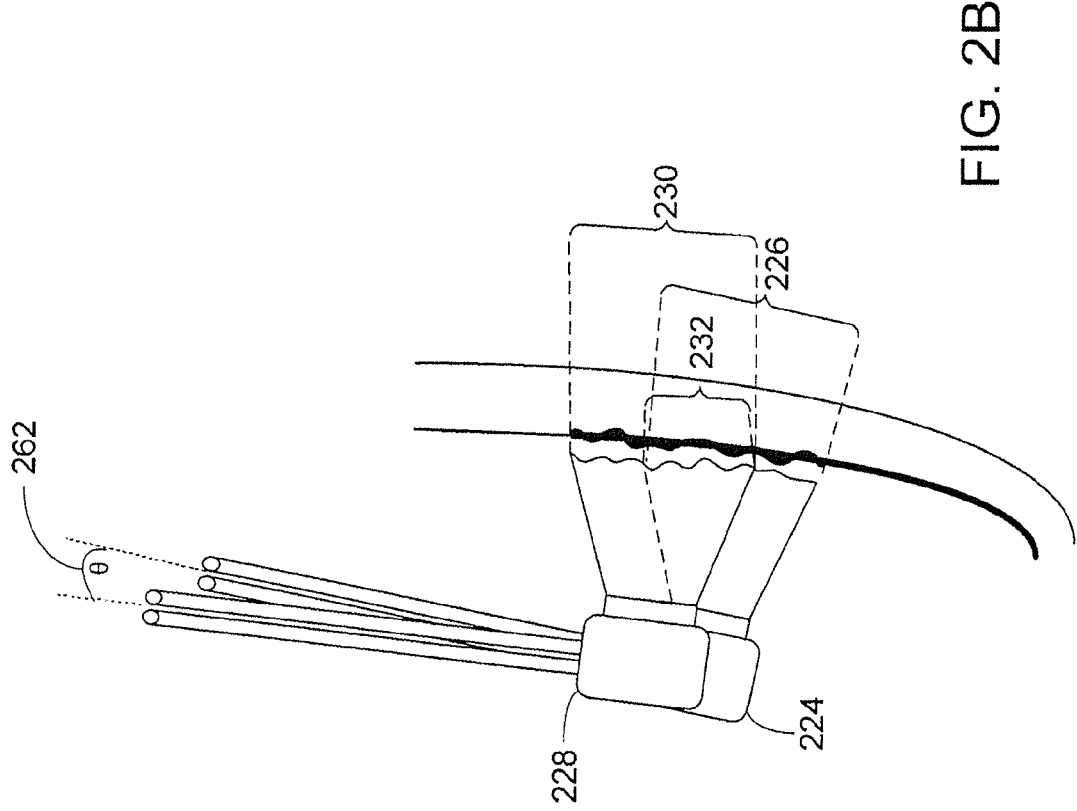
FIG. 2B is a cutaway side view of an area heat source producing overlapping swaths of vitrification on the inner surface a fused silica body.

Although consistency of heating can be improved through compensating adjustments of the area heat source, such as in its fuel, arc, or other heat source parameters, there still may be fluctuations in the applied heat as the area heat source moves over the surface to be processed. To further compensate for this, in a preferred embodiment the heated swaths laid down by the area heat source are overlapped in each successive pass so as to heat each point on the surface multiple times. This assures that no point on the surface is missed by the area heat source, and as well multiple heatings tend to compensate for irregularities induced by imperfect heating during a single pass, and thus tend to achieve a uniform layer thickness throughout. In this embodiment, as depicted in FIG. 2B, the area heat source is first placed into position 224 to the create a first swath 226, and then during the next revolution of the heat source around the piece's axis of revolution the area heat source is moved transversely, along the axis of rotation, by a smaller amount than the width of swatch 226, into position 228, to create a second, overlapping swath 230, with an overlapping area 232. This sets up a "push-broom effect" of overlapping swaths that re-heats portions of the previously heated area and ensures there is no missed margin between two adjacent swaths.

Figure 2C:
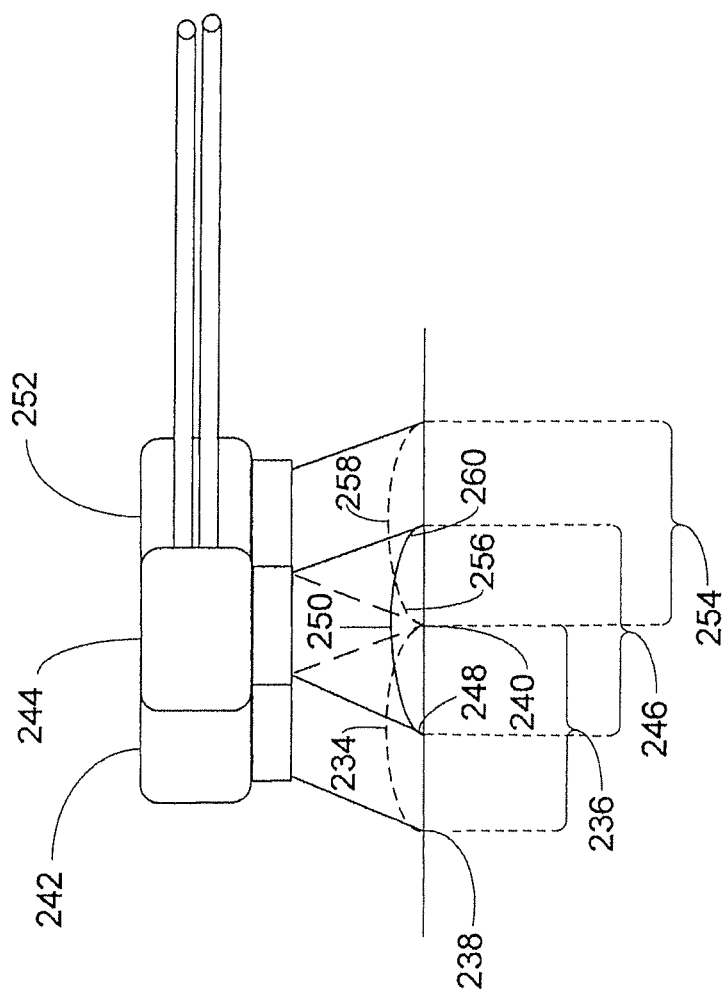
FIG. 2C is a cutaway side view of an area heat source producing half-width overlapping swaths of vitrification on the inner surface a fused silica body.

In a preferred embodiment the movement of the area heat source per pass in the transverse direction is substantially one half the width of the swath rendered viscous during the previous pass. This leads to each point on the surface being covered by two passes of the overlapping area heat source movement, giving each point on the surface an opportunity to melt again and reflow, improving the evenness of vitreous silica flow. Overlapping by one-half the width also maximally compensates for crowning that may occur within the swath. Such crowning is due to temperatures in the middle of heat source—and thus in the middle of the swath on the surface—being higher than those at the edges; such crowning may take the form, as depicted in FIG. 2C, of a greater material thickness 234 in the middle of swath 236 than on its edges 238 and 240. By moving the area heat source from position 242 to position 244 and thus offsetting a successive swath 246 by one-half the width of the transverse swath width, the thinner portion 248 of the swath in the subsequent pass is applied to the area of thickening influence 234 from the previous pass, compensating for it, while the area of thickening influence 250 is applied to the thinner portion 240 of the previous swath, compensating for it as well. In the next subsequent pass with the heat source in position 252 and creating swath 254, thinner-influenced portion 256 is applied to the previously thickened area 250, and thicker-influenced area 258 is applied to previously thinner area 260, again compensating in both areas.

In certain embodiments, the heat source is not in physical contact with the surface but rather is passed over it at a standoff distance 206, as depicted in FIG. 2A. In one such embodiment, the distance is typically about an inch. For optimal heating, certain rotational adjustments may be imparted to the heat source. As noted above, the long dimension of a linear heat source is optimally transverse to the direction of travel, and in a helical scan the direction of travel of the area heat source is substantially around the axis of rotation; therefore, the area heat source is rotationally adjusted around the radial axis to align the long dimension substantially parallel to the axis of rotation. For purposes of an even application of heat along the long dimension, the area heat source is rotationally adjusted around the tangential axis to be normal to the surface portion being vitrified. As the heat source moves toward the aft end of a concave surface, the diameter of the cavity along the radial axis typically expands, and the "cone angle" of the surface, that is, the tangent of the local inner surface in the plane defined by the axis of rotation and the radial axis, typically transitions toward being parallel with the axis of rotation. The heat source is optimally rotationally adjusted around the tangential axis in a successive pass by an angle 262, as depicted in FIG. 2B, to maintain the heat source normal to the surface at the point of such successive pass.

Figure 2D:
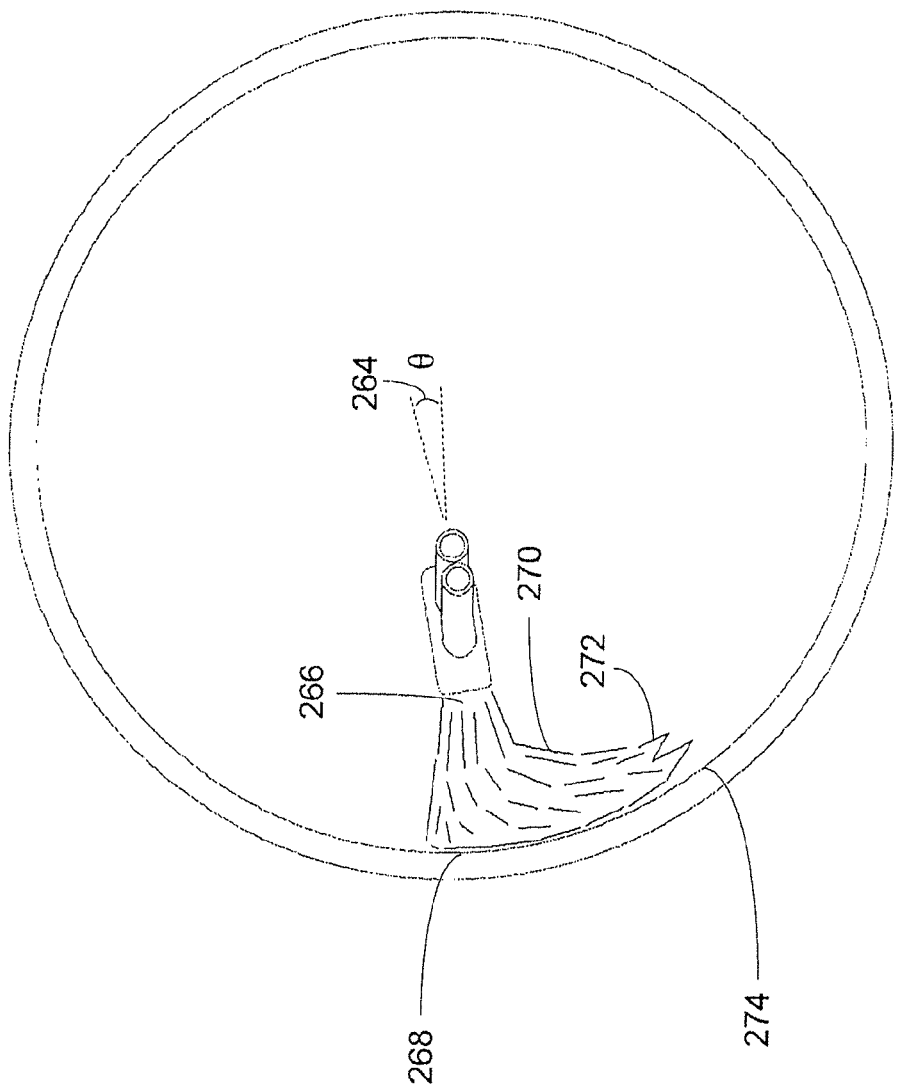
FIG. 2D is a top view of an area heat source moving within a fused silica body and vitrifying its inner surface.

Regarding further rotational adjustments for the heat source, as shown in top view FIG. 2D, in certain embodiments the area heat source is adjusted around an axis parallel to the axis of rotation (or more precisely, around an axis canted from the axis of rotation by the amount of any rotational adjustment of the heat source about the tangential axis as noted above) by an angle 264 to project the heat or flame 266 emanating from the heat source in the area heat source's direction of movement, such that the heat or flame contacts a portion 268 of the surface that is approaching the area heat source in its relative movement. In certain preferred embodiments the heat source is not rotationally adjusted around this axis to be fully normal to the surface with its heat plume or flame contacting the surface nearest the body of the heat source, due to certain problems occurring with such a direct, normal application of heat or flame. Such problems include increased thermal shock, increased displacement of molten material from a directly normal heat or flame projection, and a bounce-back of applied heat that both undesirably removes heat from the surface and undesirably reflects the heat back onto the mechanism of the area heat source. These unwanted effects are reduced or removed by directing the heat or flame out in front of the heat source's motion, thus allowing the flame or heat plume to redirect 270 out along the surface in the direction of travel after contacting the surface. This leading plume 272 also preheats a portion 274 of the surface as it comes into the outer fringes of the flame or heat plume, providing a heating transition and decreasing the time gradient of temperature change experienced by such approaching portion. For all these reasons, the area heat source in such embodiments is adjusted around this axis toward the direction of its travel by angle 264 in an amount in one embodiment of typically 10 to 15 degrees from normal to the surface.

Additional translations along and rotations around various axes may be employed to position the heat plume properly with respect to the surface. For example, to maintain coverage of the surface as the diameter of the inner cavity increases toward the top of a conical piece, the area heat source may be translated outward along the radial axis to maintain a constant standoff distance from the surface.

In the course of performing the vitrification process, differential expansion between different portions of the body undergoing processing may be caused by various portions of the body being at different temperatures, introducing internal strain between those portions. This can be reduced, however, by minimizing the temperature differential between the portion being superheated for vitrification and the rest of the silica body. To achieve this, in certain embodiments most or all of the entire piece is bias heated during the superheating process, in order to decrease the temperature differential at the point of superheating by the amount of the bias heating. This bias heating is employed at a temperature range below the temperatures that would lead to unwanted crystalline generation, in one embodiment typically in the range of 600° C. to 1000° C.

Intra-layer and inter-layer stresses can also be reduced by techniques permitting the silica melted during the vitrification process to cohere more smoothly and naturally. In addition to the multiple-pass heating technique discussed above, in one embodiment, after vitrification the piece is annealed, either in the kiln or in another oven, to allow stresses placed in the vitreous layer during its creation to relax. Ideally, the annealing is brief, in order to avoid crystalline generation.

In a typical piece, the inner surface to be processed may adjoin other surfaces that would benefit from generation of a vitrified layer, although with respect to these surfaces the vitreous layer may not be strictly considered an inner layer. In the aerospace radome application, the pharmaceutical crucible or pestle application, and other applications as well, the width of the wall at the wall's edge may express as a rim or edge adjoining the cavity. In the radome application this edge is termed the "aft edge" based on its orientation within the missile or other airframe. The process used to vitrify the inner layer of the piece can also be used to vitrify a layer on such an adjoining rim or aft edge.

A manufacturing apparatus, along with methods of operating such apparatus, in accord with the present invention and usable for producing a fused silica body with an inner vitreous silica layer in accordance with embodiments of the present invention and practicing methods in accordance with embodiments of the present invention is further and more specifically described in a co-pending patent application entitled "APPARATUS FOR PRODUCING A VITREOUS INNER LAYER ON A FUSED SILICA BODY, AND METHOD OF OPERATING SAME," Ser. No. 13/076,938, the entire content of which is incorporated herein by this reference.

Although limited embodiments of the present invention have been specifically described and illustrated, many modifications, combinations, and variations will be apparent to those skilled in the art. Accordingly, it is to be understood that a fused silica body with vitreous silica inner layer which is constructed, along with the methods for constructing it, according to the principles of this invention may be embodied other than as specifically described herein. The invention is also defined in the following claims.

What is claimed is:

1. A method of making a fused silica body comprising a layer of vitreous silica on at least a portion of an inner surface of the fused silica body, the method comprising:
   passing a heat source over at least a portion of the inner surface by rotating at least one of the heat source and the fused silica body about a longitudinal axis to heat the portion to a temperature causing vitrification; and
   rotating the heat source about an axis perpendicular to the longitudinal axis and tangential to a point on the portion of the inner surface proximal the heat source as the at least one of the heat source and the fused silica body is rotating about the longitudinal axis to maintain the heat source in an orientation normal to the portion of the inner surface in a plane parallel to the longitudinal axis.

2. The method of claim 1, wherein the passing of the heat source over the at least a portion of the inner surface is configured to heat at one time a relatively small area of the inner surface.

3. The method of claim 2, wherein the heat emanating from the heat source is between 2600° C. and 3200° C.

4. The method of claim 2, comprising passing the heat source over the surface at a substantially constant standoff distance.

5. The method of claim 2, wherein a pattern of emanating heat from the heat source is longer in one direction than in another direction, and the longer one direction is disposed transversely to a direction of relative movement of the heat source with respect to the surface about the longitudinal axis.

6. The method of claim 5, wherein a portion of the surface rendered viscous by a pass of the heat source overlaps a portion previously rendered viscous by a previous pass of the heat source.

7. The method of claim 6, wherein a width of the overlap is approximately one half a width of the portion previously rendered viscous by the previous pass of the heat source.

8. The method of claim 2, wherein the heat source is canted in substantially a direction of relative movement of the heat source with respect to the surface about the longitudinal axis.

9. The method of claim 2, further comprising moving at least one of the fused silica body and the heat source along the longitudinal axis such that the heat source is moved helically in relation to the inner surface.

10. The method of claim 9, wherein the helical movement is produced by rotation of the body about the longitudinal axis and linear movement of the heat source along the longitudinal axis.

11. The method of claim 10, wherein the speed of rotation of the body varies.

12. The method of claim 10, further comprising translating the heat source inward or outward with respect to the longitudinal axis so as to maintain a substantially constant standoff distance between the heat source and portions of the inner surface having varying distances from the longitudinal axis of rotation.

13. The method of claim 2, further comprising bias heating a remaining portion of the body to a temperature lower than the temperature causing vitrification to which the portion of the inner surface is heated by the heat source.

14. The method of claim 13, wherein the bias heating raises the temperature of the remaining portion of the body to between approximately 600° C. and approximately 1000° C.

15. The method of claim 1, further comprising annealing the body.

\* \* \* \* \*